US008803895B2

(12) United States Patent
Nonaka

(10) Patent No.: US 8,803,895 B2
(45) Date of Patent: Aug. 12, 2014

(54) DISPLAY DEVICE AND IMAGE DISPLAY METHOD

(75) Inventor: Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 74 days.

(21) Appl. No.: 13/176,250

(22) Filed: Jul. 5, 2011

(65) Prior Publication Data

US 2012/0019545 A1 Jan. 26, 2012

(30) Foreign Application Priority Data

Jul. 23, 2010 (JP) ................................ P2010-165536

(51) Int. Cl.
*G09G 5/39* (2006.01)
*G06K 9/60* (2006.01)

(52) U.S. Cl.
USPC .......................................... 345/531; 382/305

(58) Field of Classification Search
CPC ........... G09G 5/393; G09G 5/39; G09G 1/60; G06F 17/30265; G06F 17/30247; G06F 17/3025

See application file for complete search history.

(56) References Cited

U.S. PATENT DOCUMENTS

| 2002/0154242 A1* | 10/2002 | Robins et al. ................. 348/362 |
| 2002/0172421 A1* | 11/2002 | Kondo et al. ................. 382/173 |
| 2009/0070669 A1 | 3/2009 | Hirota |
| 2010/0007920 A1* | 1/2010 | Odaira ........................ 358/1.15 |

FOREIGN PATENT DOCUMENTS

JP 2007-299339 11/2007

OTHER PUBLICATIONS

Finding Frequest Data Items in Data Streams Automata, Languages and Programming, Lecture Notes in Computer Science vol. 2380, 2002, pp. 693-703.*

* cited by examiner

*Primary Examiner* — David Zarka
*Assistant Examiner* — Tapas Mazumder
(74) *Attorney, Agent, or Firm* — John C. Pokotylo; Straub & Pokotylo

(57) ABSTRACT

An image display device of the present invention comprises a first determination section for monitoring information respectively appended to a plurality of images, and detecting information that has been appended to the most images among the plurality of images as first information, a second determination section for detecting information other than the first information, among the information that has been respectively appended to the plurality of images, as auxiliary information, and a third determination section for detecting an image to which the first information has been appended, and which is an image having the auxiliary information, as a priority image.

14 Claims, 12 Drawing Sheets

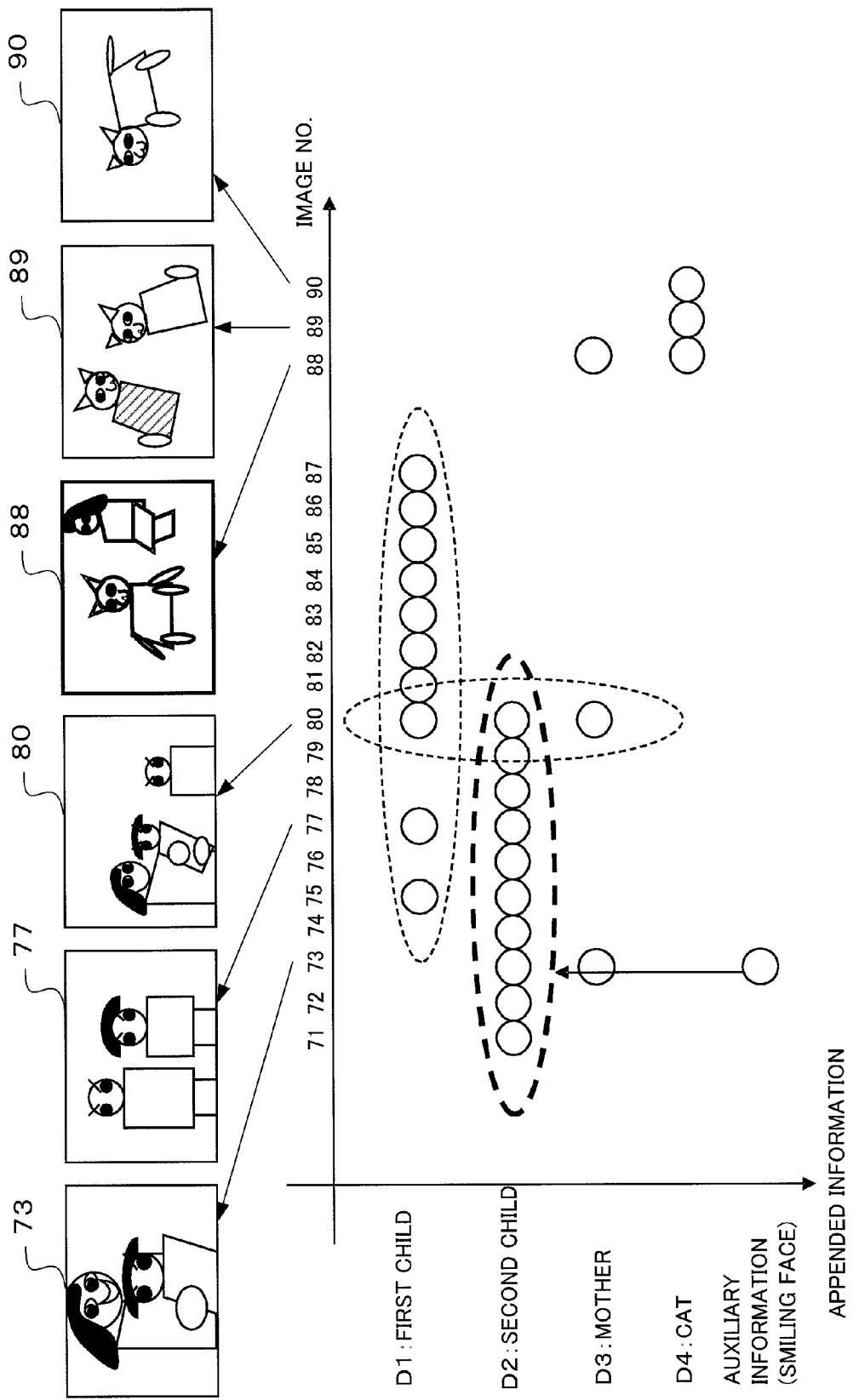

DISPLAY DEVICE AND IMAGE DISPLAY METHOD

Benefit is claimed, under 35 U.S.C. §119, to the filing date of prior Japanese Patent Application No. 2010-165536 filed on Jul. 23, 2010. This application is expressly incorporated herein by reference. The scope of the present invention is not limited to any requirements of the specific embodiments described in the application.

BACKGROUND OF THE INVENTION

1. Field of the Invention

The present invention relates to an image display device and an image display method for retrieving and displaying images from a plurality of stored images.

2. Description of the Related Art

In recent years, with the digitalization of imaging devices and the increase in capacity of storage devices, numerous images are being stored within the imaging device or in storage devices external to the imaging device. Various approaches have been proposed for appreciating the plurality of images.

For example, in Japanese patent laid open No. 2009-80794 (laid-open Apr. 16, 2009), if images are displayed on a time axis, in the case where in the distribution is dense, images become overlaid or small, and visibility to the user is lowered. In order to solve this problem an image management device is disclosed so as to carry out display in accordance with priority of an image.

SUMMARY OF THE INVENTION

An object of the invention is to provide an image display device and image display method for displaying images, with which it is possible to confirm a representative image of an image group at a glance by selecting an image with a high display priority.

An image display device of the present invention comprises a first determination section for monitoring information respectively appended to a plurality of images, and detecting information that has been appended to the most images among the plurality of images as first information, a second determination section for detecting information other than the first information, among the information that has been respectively appended to the plurality of images, as auxiliary information, and a third determination section for detecting an image to which the first information has been appended, and which is an image having the auxiliary information, as a priority image.

Also, an image display device of the present invention comprises a storage section for storing a priority of images to which information has been respectively appended, a first determination section for detecting information, among the information that has been appended to the plurality of images stored in the storage section, that has been appended to the most images as first information, a second determination section for detecting information other than the first information, among the information that has been respectively appended to the plurality of images stored in the storage section, as auxiliary information, a third determination section for detecting an image having the first information and the auxiliary information as a priority image, and a display section for displaying the priority image.

Also, an image display method of the present invention comprises monitoring information respectively appended to a plurality of images, and detecting information that has been appended to the most images among the plurality of images as first information, detecting information other than the first information, among the information that has been respectively appended to the plurality of images, as auxiliary information, and detecting an image to which the first information has been appended, and which is an image having the auxiliary information, as a priority image.

BRIEF DESCRIPTION OF THE SEVERAL VIEWS OF THE DRAWINGS

FIG. 8 is a diagram for describing determination of a priority image in the camera of the second embodiment of the present invention.

DETAILED DESCRIPTION OF THE PREFERRED EMBODIMENTS

Figure 1:
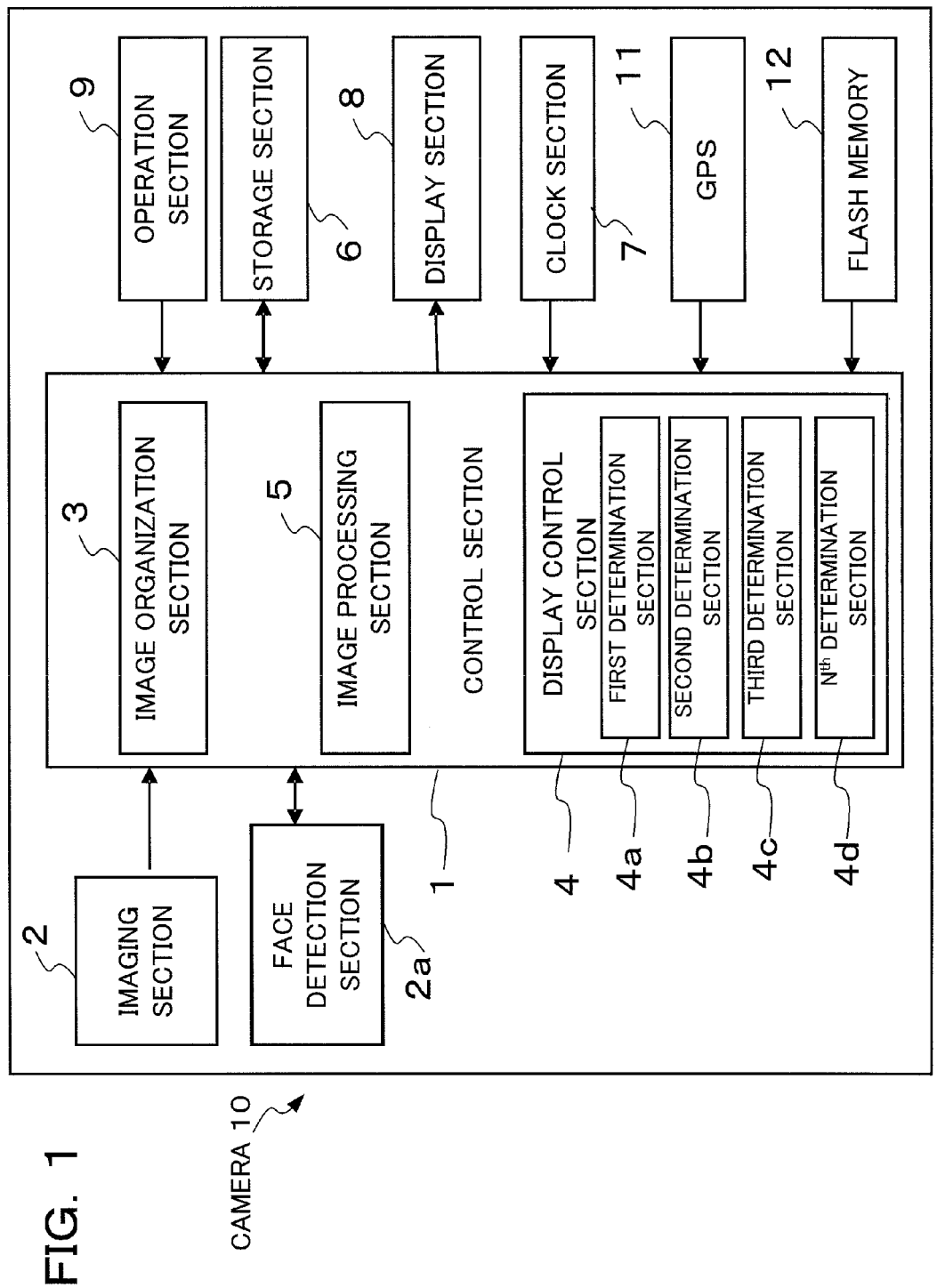
FIG. 1 is a block diagram showing the overall structure of a camera of a first embodiment of the present invention, mainly concentrating on the electrical systems.

Preferred embodiments using a camera to which the present invention has been applied will be described in the following in accordance with the drawings. A camera of a preferred embodiment of the present invention is a digital camera, and has an imaging section, with a subject image being converted to image data by this imaging section, and the subject image then being subjected to live view display on a display section arranged on a rear surface of a main body based on this converted image data. A photographer determines composition and shooting timing while observing the live view display. Also, image data that has been stored in the storage medium can be played back and displayed on the display section if playback mode is selected. If playback mode 2 (photo surfing mode) is selected at the time of playback, similar image are retrieved based on tags affixed to the images, and images having relevance are sequentially displayed.

The structure of a camera 10 relating to a first embodiment of the present invention will be described using the block diagram shown in FIG. 1. The camera 10 comprises a control section 1, an imaging section 2, a face detection section 2a, a storage section 6, a clock section 7, a display section 8, an operation section 9, a Global Positioning System (hereafter referred to as GPS) 11, a flash memory 12, etc.

The imaging section 2 includes a photographing lens, exposure control portions, such as a shutter, an image sensor, image sensor drive and readout circuits, etc., and converts a subject image that has been formed by the photographing lens to image data using the image sensor, and outputs this image data. Also, focusing of the photographing lens is carried out by adjusting the focusing lens so that high-frequency components in image data become peak. In this specification, image data is not limited to image signals that have been output from the image sensor, and it is also possible to use image data that has been processed by an image processing section 5 within the control section 1, and image data stored in the storage section 6 etc.

The face detection section 2a is input with image data that has been subjected to image processing by the image processing section 5 within the control section 1, which will be described later, and detects whether or not a portion of a face is included within the image. If the result of this detection is that a face portion is included, the position and size of the face and degree of smile are detected, and detection results are output to the control section 1. Degree of smile is a numerical value representing the extent to which a person is smiling, and if it is a smiling face it will have corners of the eyes turned downward and teeth can be seen in the mouth, and these changes are detected and made into numerical values. Further, in the case where a plurality of face characteristics are registered, the face detection section 2a determines whether or not a detected face matches any of the plurality of registered faces. Determination as to whether on not it is the face of other than a person, such as an animal like a cat or dog, is also carried out.

The control section 1 is made up of a Central Processing Unit (hereafter referred to as a CPU) and peripheral hardware circuits of the CPU, and controls all processing sequences of the camera 10 in accordance with a program stored in a non-volatile storage section, such as the flash memory 12. The control section 1 includes an image organization section 3, a display control section 4, and an image processing section 5. Some of the functions of the image organization section 3 and the display control section 4 are executed by a program.

The image processing section 5 performs various image processing such as digital amplification (digital gain adjustment processing), color correction, gamma (γ) correction, contrast correction, monochrome or color mode processing, and processing for live view display for image data output from the imaging section 2. The image processing section 5 also carries out image compression processing for storing taken images, and image expansion processing for playback display of taking images that have been stored.

The image organization section 3 adjusts an image based on various information such as face information that has been detected by the face detection section 2a, which will described later, time and date information acquired from the clock section 7, and position information acquired from the GPS 11.

The display control section 4 carries out display control such as live view display, quickview display at the time of shooting, playback display and menu screens etc. on the display section 8. Live view display is display of image data, which has been acquired by the imaging section 2 and subjected to image processing for live view display by the image processing section 5, on the display section 8. With playback display, image data that is stored in the storage section 6 is read out and subjected to playback display on the display section 8.

Also, with playback display, as will be described later, if playback mode 2 is selected the display control section 4 monitors information appended to the image data stored in the storage section 6, and has a group of determination sections made up of a first determination section 4a, a second determination section 4b, and a third determination section 4c, for detecting information for which there are a lot of corresponding images or images to which a lot of information has been appended. For images other than those that have been determined by the first determination section 4a—third determination section 4c also, in order to carry out detection of the same appended information or a number of corresponding images it is necessary to increase the determination sections in accordance with the number of image groups or the number of representative images, and so up to an nth determination section 4d is prepared. The display control section 4 determines an image to be displayed with priority and carries out image display based on determination results by the determination section group.

Figure 2:
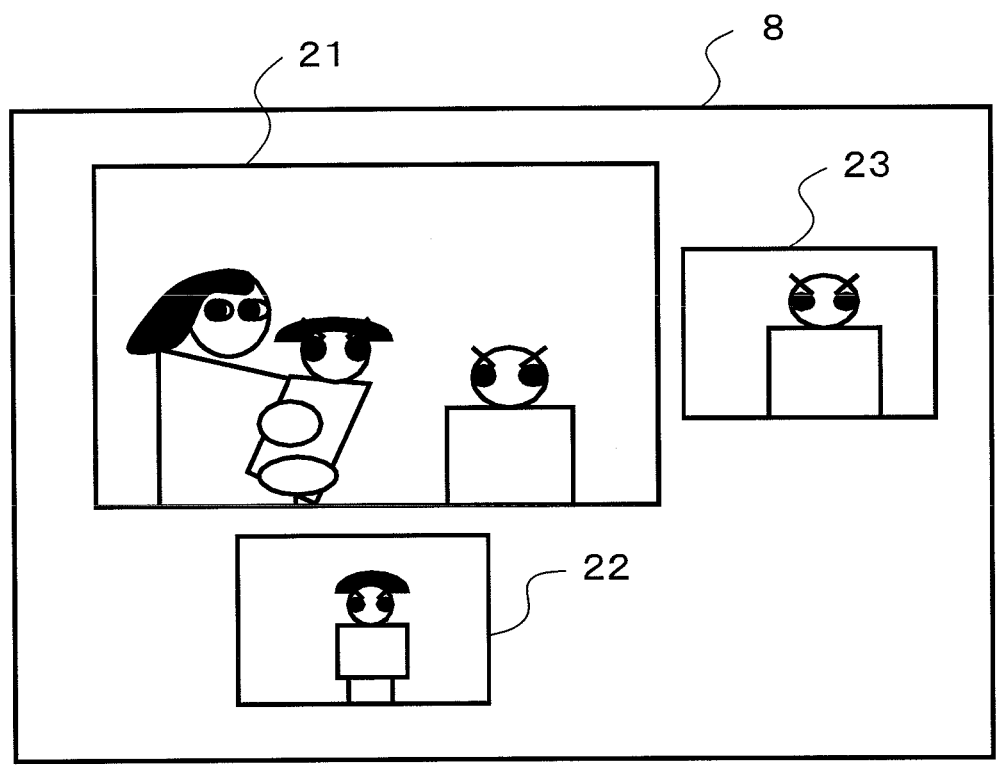
FIG. 2 is a block diagram showing an example of display of a priority image in the camera of the first embodiment of the present invention.

A display example of a priority image determined by the display control section 4 is shown in FIG. 2. Specifically, a combination of a priority image 21 and similar images 22, 23, that are similar to the priority image 21, are displayed on the display section 8. As similar images, images having the same appended information as the priority image are displayed. With the example shown in FIG. 2, a mother (woman on the left side in the image), with a first child (child on the right side in the image), and a second child (child being held by the woman in the center of the image) are depicted in the priority image 21, and displayed over a wide area within the display section 8. As similar images, a similar image 23 displaying the first child depicted in the priority image 21 and the similar image 22 displaying the second child are displayed. In this manner, as the priority image 21, an image is selected such that a lot of subjects are depicted and various similar images 22, 23 can be retrieved.

Returning to FIG. 1, the operation section 9, has various operation members such as a release button, power supply button, playback button 1, playback button 2 and menu button arranged on the outside of the camera 10, and the operation section 9 determines operational states of switches connected to these operation members and outputs the result of determination to the control section 1.

The display section 8 is connected to the control section 1, and has a monitor such as liquid crystal or organic EL arranged on a rear surface etc. of the main body, and as was described previously performs live view display, quickview display at the time shooting, playback display of stored images stored in the storage section 4, and display of control images such as menu screens. Also, a touch panel is provided on the display section 8, and if the user touches the monitor screen information such as the touched position is output to the control section 1.

The storage section 6 is constituted by a storage medium that can be fitted into and taken out of the camera body, or a built-in storage medium. Image data for still pictures and movies that have been output from the imaging section 2, and subjected to image processing by the image processing section 5, are stored in the storage section 6 together with associated information. The clock section 7 has a clock function, and outputs date and time information. At the time of shooting, this time and data information is stored in the storage medium of the storage section 6 together with image data.

The GPS 11 uses a satellite positioning system to output information relating to current position of the camera 10. It is not limited to GPS as long as it is a position detection device that can detect current position of the camera 10. For example, it is possible to utilize information relating to connection points of a mobile telephone. The flash memory 12 is an electrically rewritable non-volatile memory, and stores programs for controlling the whole of the camera 10 as was described previously. Besides programs, various data such as adjustment values are stored in the flash memory 12.

Figure 3:
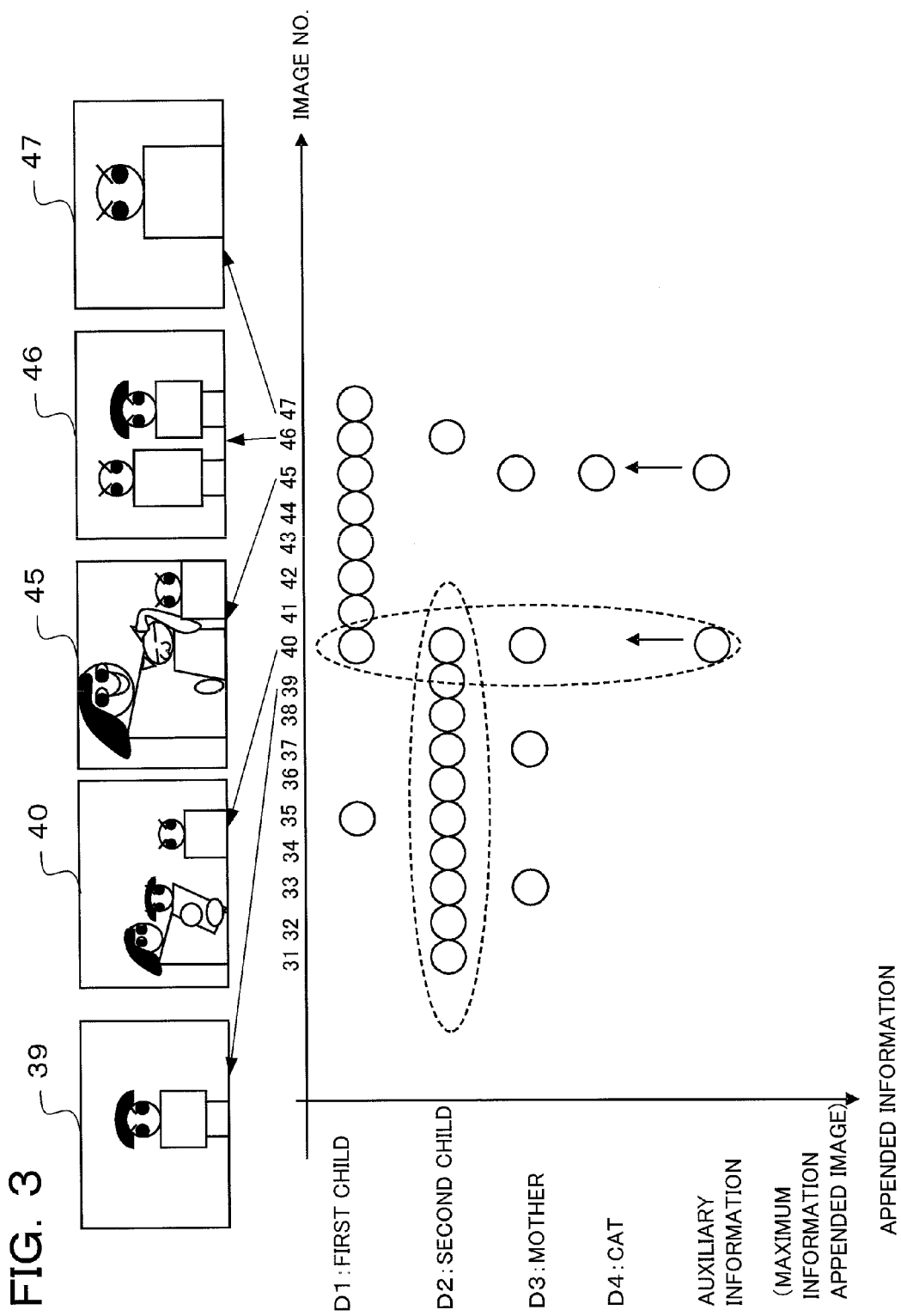
FIG. 3 is a diagram for describing determination of a priority image in the camera of the first embodiment of the present invention.

Next, image arrangement in the image organization section 3 and determination of a priority image in the display control section 4 will be described using FIG. 3. FIG. 3 is an example showing image numbers on a horizontal axis, and obtaining of information being appended for every image on the horizontal axis, and what information is appended to each image. This information is appended to image data as tag information.

In the example shown in FIG. 3, image numbers are from 31 to 47, and appended information (tag information) is exemplified by D1 representing a first child, D2 representing a second child, D3 representing a mother, and D4 representing a cat. The first child, second child, mother, and cat are detected by the face detection section 2*a*, and when respective image data are stored in the storage section 6 results of this detection are stored together with the images as tag information.

Also, in FIG. 3 each of the images of image numbers 39, 40, 45, 46, and 47, are displayed collectively. Image 39 is an image of the second child, and so D2 representing the second child is stored together with the image data as appended information. Image 40 is an image depicting the first child, the second child and the mother, and so D1, D2 and D3 representing these is stored together with the image data as appended information. Image 45 is an image depicting the first child, the mother and the cat, and so D1, D3 and D4 representing these is stored together with the image data as appended information. Image 46 is an image depicting the first child and the second child and so D1 and D2 representing these is stored together with the image data. Image 47 is an image depicting the first child independently and so D1 representing this is stored together with the image data.

In this way, the image organization section 3 organizes what appended information is appended to each image. The previously described first determination section 4*a* within the display control section 4 carries out determination for data for a large number of images using information on images that have been organized by the image organization section 3. This determination is referring to number of images for each appended information and determining appended information that is appended to the most images.

With the example shown in FIG. 3, D1 is attached to image numbers 35 and 40 to 47, a total of nine images. Similarly, D2 is attached to image numbers 31 to 40, and 46, a total of eleven images. D3 is attached to image number 33, etc., a total of four images. D4 is attached to image number 45, a total of one image. The first determination section 4*a* determines from these detection results that data appended to the most images is D2 representing the second child, and first information is appended to this data D2.

Next, the second determination section 4*b* determines an image having the most appended information using information on images that have been organized by the image organization section 3. This determination is referring to appended information for each image and determining an image to which the most appended information has been appended.

With the example shown in FIG. 3, image number 31 has one item of information while images number 33, 35, 37, and 46 have two items of information. Also, image number 40 has three items of information D1-D3, and image number 45 has three items of information D1, D3 and D4. Accordingly, image numbers 40 and 45 have a lot of items of information within the exemplified images, and so auxiliary information is appended to these images.

The third determination section 4*c* determines a priority image based on determination results from the first determination section 4*a* and determination results from the second determination section 4*b*. Specifically, it is determined by the first determination section 4*a* that images having appended information D2 are the most numerous, and it is determined by the second determination section 4*b* that image numbers 40 and 45 have the most appended information. Then, in the example shown in FIG. 3, based on the two determination results the third determination section 4*c* sets image number 40, for which an AND relationship between the two results is established, as a priority image.

Next, operation of this embodiment will be described using the flowcharts shown in FIG. 4 and FIG. 5. This processing flow is executed by a CPU within the control section 1 in accordance with the program stored in the flash memory 12.

Figure 4:
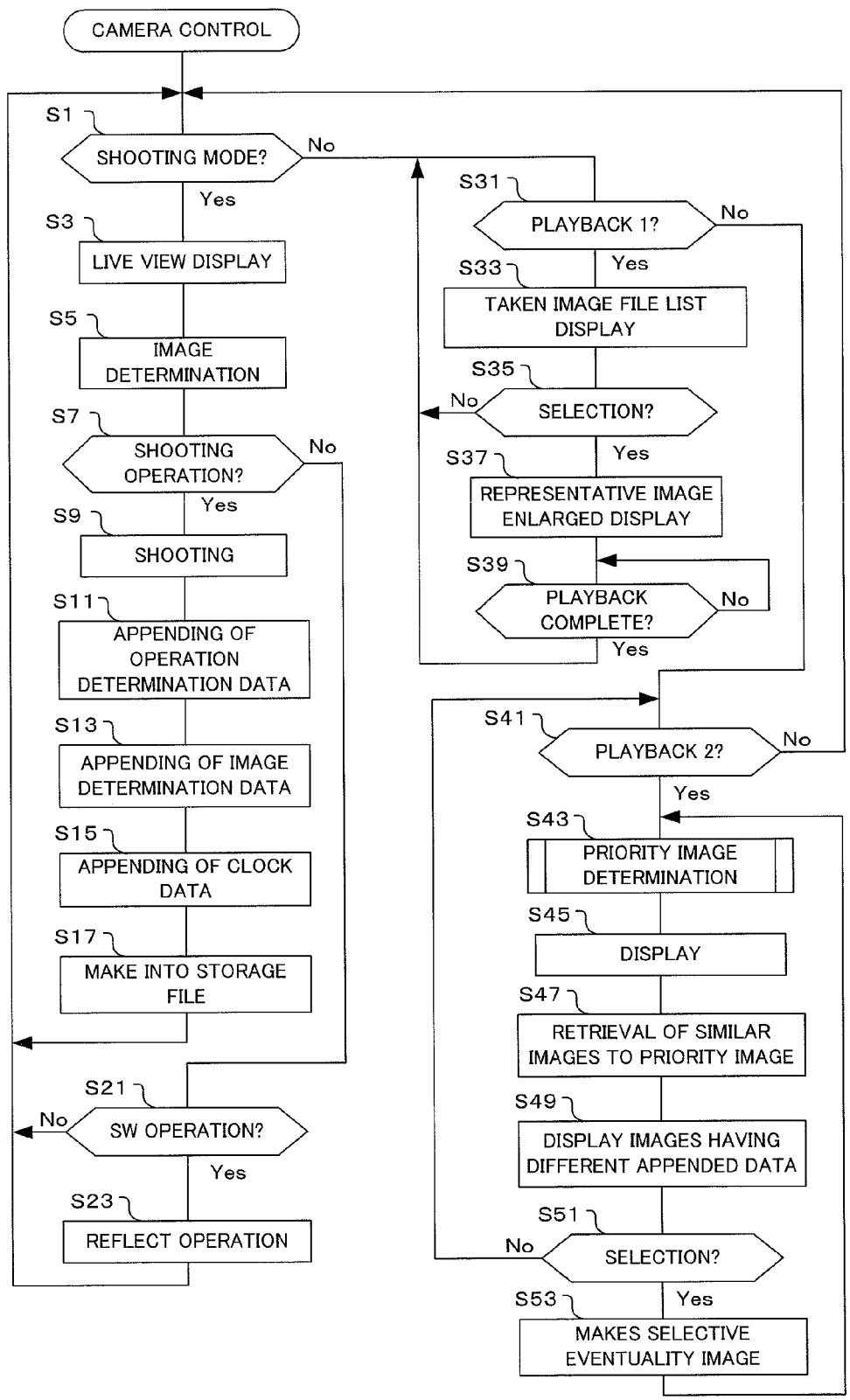
FIG. 4 is a flowchart showing control operations of the camera of the first embodiment of the present invention.
Figure 5:
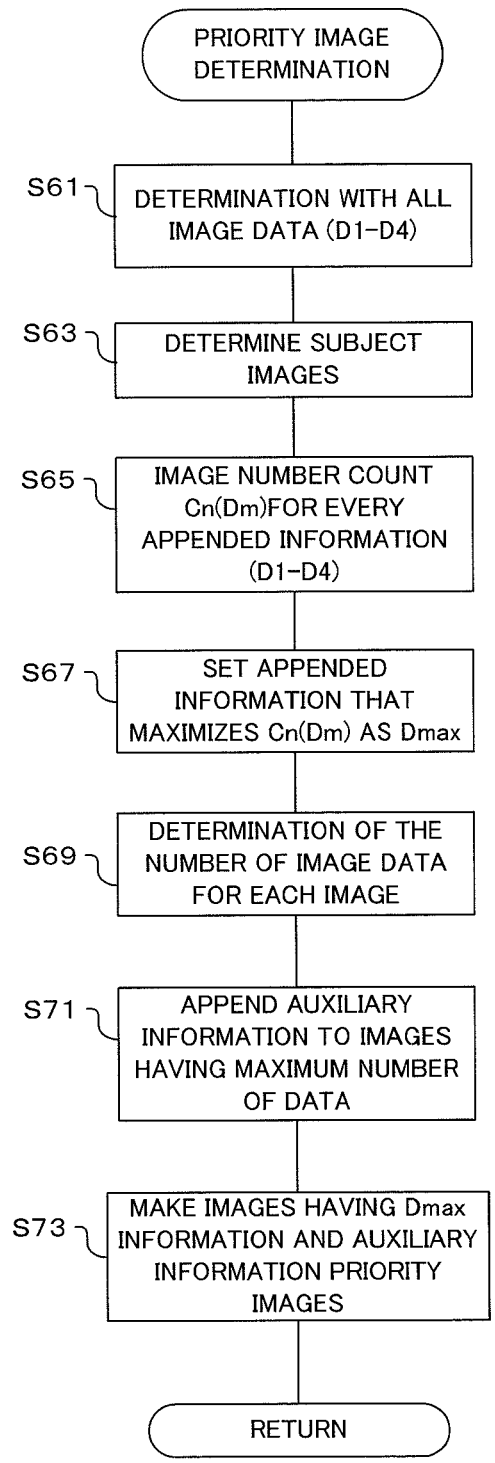
FIG. 5 is a flowchart showing operation for priority image determination for the camera of the first embodiment of the present invention.

If the processing flow shown in FIG. 4 is entered, it is first determined whether or not the camera is in shooting mode (S1). With this camera, in the event that a mode such as playback mode has not been selected, shooting mode is set as the default mode, and so in this step determination is based on whether or not another mode has been set.

If the result determination in step S1 is that the camera is in shooting mode, then live view display is next carried out (S3). Here, the image processing section 5 generates image data for live view display based on image data from the imaging section 2, and the live view image is displayed on the display section 8. A user can determine composition and photo opportunity by looking at the live view display.

If live view display is carried out, image determination is next carried out (S5). It is determined by the face detection section 2*a* whether a face exists, and, in the event that a face exists, it is determined if there is a person matching a face of that position and size, and that is registered, or if there is a face of a cat or a dog etc.

Once image determination has been carried out, it is next determined whether or not a shooting operation has been carried out (S7). At the time of shooting the user presses the release button within the operation section 9, and so in this step the operation state of the switch that is connected to the release button is detected and determination carried out.

If the result of determination in step S7 is that there has been a shooting operation, shooting is carried out (S9). Here, a focus operation is carried out so as to focus on a subject, an exposure control section such as an aperture is controlled to give appropriate exposure, and image data for storage is generated by the image processing section 5 based on image data from the imaging section 2. In the exposure control, control is carried out in accordance with the shooting mode that has been previously set by the user, such as portrait mode, landscape mode, sports mode or night shooting mode.

Once shooting has been carried out, operation determination data appending is carried out (S11). Here, information at the time of shooting by the user, such as shooting mode information at the time of shooting, information relating to a subject that has been focused on, in the case of the photographing lens being a zoom lens information such as whether the shooting was performed at the wide-angle end or the telephoto end, or position information acquired by the GPS 11, is acquired, and correlated to the image data that was acquired in step S9. These items of information are not shown in FIG. 3, but can function as the appended information.

Once appending of operation determination data has been carried out, appending of image determination data is next carried out (S13). Here, results of image determination carried out in step S5, immediately before carrying out the shooting operation, and image data acquired in step S9 are correlated. The results of this image determination fulfill a function as appended information D1 to D4 that were described in FIG. 3.

Once appending of image determination data has been carried out, appending of time data is carried out next (S15). Here, time and date information from the clock section 7 is acquired at the time of the shooting in step S9, and this is correlated with the image data. This time and date information is not shown in FIG. 3, but it can fulfill a function as the appended information.

Once appending of time data has been carried out, making the data into a storage file is carried out (S17). Here, information that was correlated in steps S11 to S15 is stored as appended information (tag information) in the storage section 6 together with the image data. Once making the data into a storage file has been carried out, processing returns to step S1.

If the result of the termination in step S7 is that a shooting operation was not carried out it is next determined whether or not there has been a switch operation (S21). Here, it is determined whether or not any of the various switches such as the menu button of the operation section 9 has been operated. If the result of this determination is that there has not been a switch operation, processing returns to step S1.

On the other hand, if the result of determination in step S21 is that there has been a switch operation, reflecting of the switch operation is carried out (S23). Here, processing according to the type of operated switch is executed. Once this processing has been carried out, processing returns to step S1.

If the result of determination in step S1 is not shooting mode, it is next determined whether or not the camera is in playback mode 1 (S31). Here, it is determined whether or not the playback button 1 has been operated. In this embodiment, playback modes are playback mode 1 where normal playback is carried out, and playback mode 2 where a plurality of images can be retrieved one after the other, like a photo surfing mode. With this embodiment, playback mode 1 and playback mode 2 operate separately but it goes without saying that is also possible to select playback mode 2 during playback mode 1.

If the result of determination in step S31 was playback mode 1, taken image file list display is next carried out (S33). Here, thumbnail image data for taken images that are stored in the storage section 6 are read out, and this display is performed on the display section 8 with the thumbnail images.

Once list display of the taken image files has been carried out, it is next determined whether a file has been selected (S35). If the user desires enlarged display from among taking images that are being list displayed, that taken image is touched, and so in this step it is determined if the screen of the display section 8 has been touched, and if it has been touched it is determined which taken image has been touched. Instead of the touch operation, it is also possible to select an image using an operating member such as across shaped button.

If the result of determination in step S35 is that an image has not been selected processing returns to step S31. On the other hand, if the result of determination is that an image has been selected, the selected image is subjected to enlarged display as a representative image (S35). Here, image data of the selected image is read out and subjected to enlarged display on the display section 8.

Once enlarged display has been carried out, it is next determined whether or not playback is complete (S39). In this embodiment, playback mode 1 is completed if the playback button 1 is operated again, and so in this step it is determined whether or not the playback button 1 has been operated. If the result of this determination is that playback is not complete, enlarged display continues. On the other hand, if the result of this determination is that playback is completed, processing returns to step S31.

If the result of determination in step S31 is not playback mode 1, it is next determined whether or not the camera is in playback mode 2 (S41). As described previously, playback mode to is switched by operation of the playback button 2 and so in this step it is determined whether or not playback button 2 has been operated.

If the result of determination in step S41 is playback mode 2, playback of a priority image is then carried out (S43). Here, as was described using FIG. 3, first information is appended by the first determination section 4a to information that has been appended to the most images, auxiliary information is appended by the second determination section 4b to images having the most appended information, and a priority image is determined by the third determination section 4c based on the first information and the auxiliary information. With the example shown in FIG. 3 image No, 40 is determined to be the priority image. Details of this priority image determination will be described later using FIG. 5.

If determination of the priority image has taken place, the priority image is then displayed (S45). Here, the priority image that was selected in step S43 is displayed on the display section 8. Next, retrieval of similar images to the priority image is carried out (S47). Here, images appended with the same appended information as the appended information that has been appended to the priority image are retrieved. With the example shown in FIG. 3, image number 40 which is the priority image has D1, D2 and D3 appended as the appended information, and so similar images are retrieved based on these items of appended information. Also, besides this, it is also possible to carry out retrieval by adding time information to prioritize contiguous images, or by adding compositions that have been determined from position and size of a face, or subjects that are depicted together.

Once retrieval of similar images has been carried out those having different appended data are displayed (S49). With the similar image retrieval in step S47, there is a high possibility of a lot of images being retrieved, and in this step images having different appended data among the retrieved similar images are preferably displayed. With the example shown in FIG. 3, image No. 45 that is appended with auxiliary data and is appended with D4 that is not appended to another image is displayed. In displaying the similar images, images having relevance are displayed, but if similar images continue it will be uninteresting and so images that have points in common but in which different subjects appear are displayed. However, there may also be a need to see similar images, and in this case it is also possible to give priority to images that have been appended with similar appended data.

If images having different appended data are displayed it is determined whether or not an image has been selected (S51). When the user sets an image that is being displayed as a similar image as a priority image, and wants to retrieve images that are similar to that, the user touches the screen of the display section 8, and so in this step it is determined whether or not the screen has been touched.

If the result of determination in step S51 is that an image has not been selected processing returns to step S41. On the other hand, if the result of determination is that an image has been selected; the selected image is made the priority image (step S53) and processing returns to step S43. If processing returns to step S43, similar images to the newly set priority image are retrieved and displayed.

In this way, with the processing flow for camera control of this embodiment, at the time of shooting appended information (tag information) is correlated with image data based on image determination results etc., and stored. Also, if playback mode 2 is selected, in step S43 the type of appended information that has been appended to the most images is determined and first information is appended to this information (first determination section 4a), a type of image having the most appended information appended is determined, and auxiliary information is appended to this (second determination section 4b), and determination of a priority image is carried out based on these items of information (third determination section 4c). Then once a priority image has been determined, images that are similar to this priority image are retrieved and displayed.

With this embodiment therefore, by selecting an image that has high relevance to other images from among a plurality of images as a priority image, it is possible to ascertain at a glance what images are included. Also, if similar images are retrieved on the basis of this priority image, it is possible to efficiently retrieve and display interesting images. Specifically, since images depicting a subject that appears in a lot of images, and images having a lot of subjects appearing, are preferably selected, it is possible to ascertain at a glance what images are included.

Next, detailed processing flow for the priority image determination of step S43 will be described using FIG. 5. If the processing flow for priority image determination is entered, first, determination is performed with all appended data (S61), and a subject image is determined (S63). Here, overall appended information is taken as the subject of determination, and all images in a specified range are taken as determination subjects. In the example shown in FIG. 3, D1-D4 are all the appended data, and image numbers 31 to 47 constitute the subjects of determination.

Next, a number of images is counted for each of appended information D1 to D4, to give Cn(Dm) (S65). For example, in the example shown in FIG. 3, we get C1(D1)=9 for appended information D1, C1(D2)=11 for appended information D2, C1(D3)=4 for appended information D3, and C1(D4)=1 for appended information D4.

If count of the number of images has been carried out for each appended information, Cn(Dm) is made the maximum appended information Dmax (S67). For example, with the example shown in FIG. 3, since the count of number of images for appended information D2 of 11 is the maximum, this is made the appended information Dmax (first information). The determination of steps S65 and S67 is performed by the first determination section 4a.

Once appended information Dmax has been obtained, the number of appended data for each image is then determined (S69). For example, with the example shown in FIG. 3, image number 31 has one item of information, image numbers 33, 35, 37, and 46 have two items of information, while image No. 40 and image No. 45 have three items of information.

If the number of appended information has been determined for each image, auxiliary information for images having the maximum data number is appended (S71). For example, with the example shown in FIG. 3, image numbers 40 and 45 have the most items of information and so auxiliary information is appended to those images. The determination in steps S69 and S71 is carried out by the second determination section 4b.

Next, an image having the Dmax information and the auxiliary information is set as a priority image (S73). For example, with the example shown in FIG. 3, image No. 40 has D2 which is the Dmax information, and has the auxiliary information, and so is set as the priority image. The determination in step S73 is carried out by the third determination section 4c. Once the priority image has been determined in step S73, processing returns to the originating flow.

As has been described above, the first embodiment of the present invention information is provided with a first determination section 4a for searching for information that has been respectively appended to a plurality of images and searching for information that has been appended to the most images among the plurality of images, as first information, a second determination section 4b for searching for information other than the first information within information that has been respectively appended to the plurality images, as auxiliary information, and a third determination section 4c for searching for an image that has the first information appended and that has the auxiliary information, as a priority image. It is therefore possible to select a representative image representing an image group. With this embodiment, an image having the most information is given priority, such as an image in which the most subjects appear or an image having other information appended. Also, since there is association with a lot of images, it is possible to retrieve a lot of similar images and it is possible to display images that have relevance and maintain interest.

Next, a second embodiment of the present invention will be described using FIG. 6 and FIG. 7. In the first embodiment, a priority image was selected by giving priority to subjects with the highest frequency of appearance. With the second embodiment, on the other hand, it is possible to select a plurality of specific subjects to be given priority.

The structure of the second embodiment is similar to the block diagram shown in FIG. 1 and so detailed description will be omitted. However the second embodiment differs from the first embodiment in that the second determination section 4b determines appended information for the most images that have been appended with information other than the first information.

Selection of the priority image in the second embodiment will be described using FIG. 6. FIG. 6, similarly to FIG. 3, is an example showing image numbers on a horizontal axis, and obtaining of information being appended for every image on the horizontal axis, and what image information is appended to each image. With the example shown in FIG. 6, image numbers on the horizontal axis are images 50 to 67, D1, D2, and D3 are appended information on the vertical axis, and the meanings of D1-D3 are the same as for the case of FIG. 3.

Figure 6:
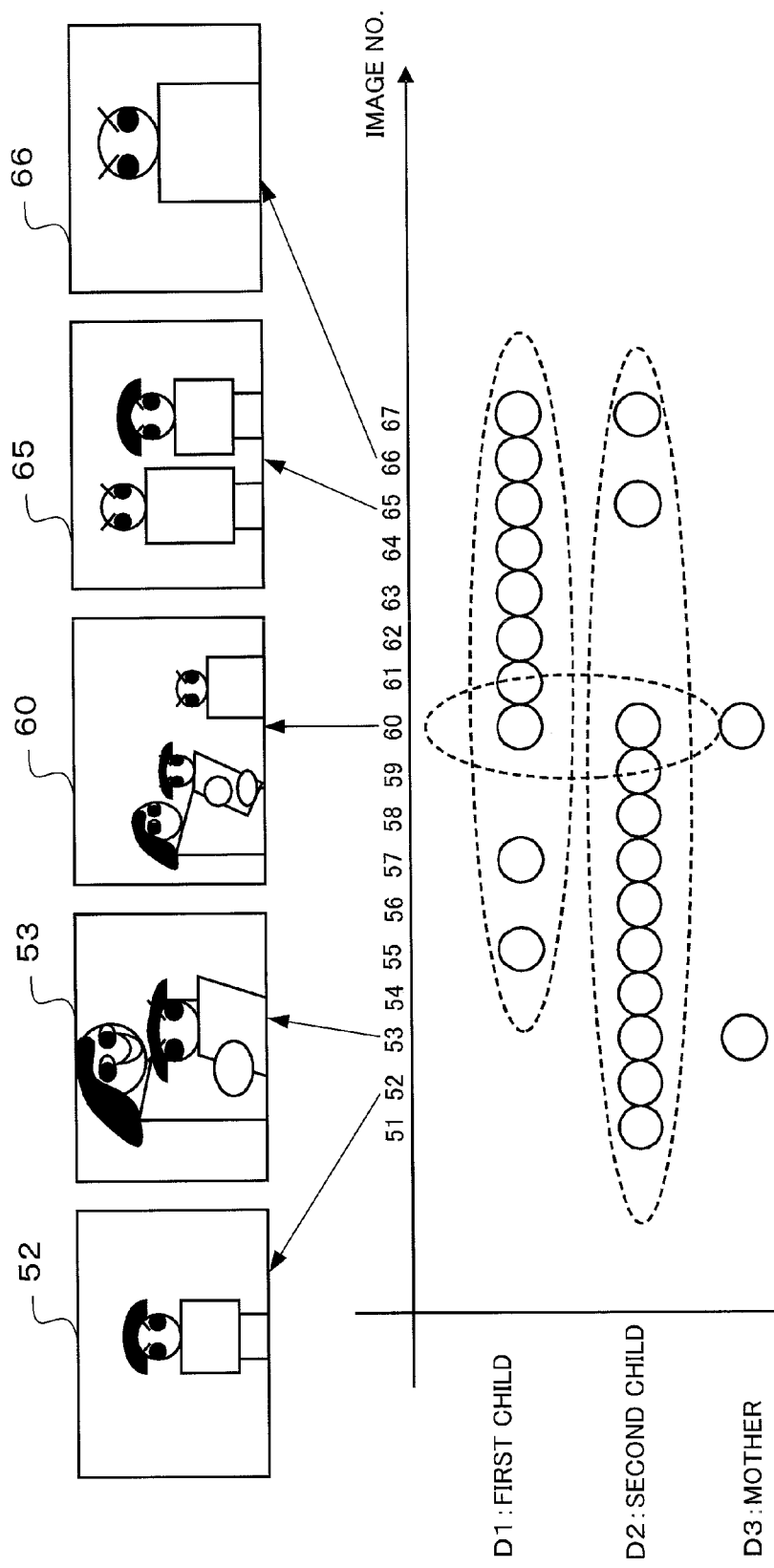
FIG. 6 is a diagram for describing determination of a priority image in a camera of a second embodiment of the present invention.

In FIG. 6, image numbers 52, 53, 60, 65 and 66 are displayed together. Image 52 is an image of the second child, and so D2 representing the second child is stored together with the image data as appended information. Image 53 is an image depicting the second child and the mother, and so D2 and D3 representing these is stored together with the image data as appended information.

Image 60 is an image depicting the first child, the second child and the mother, and so D1, D2 and D3 representing these is stored together with the image data as appended information. Image 65 is an image depicting the first child and the second child and so D1 and D2 representing these is stored together with the image data. Image 66 is an image depicting the first child on its own and so D1 representing this is stored together with the image data.

With the example shown in FIG. 6, D1 is appended to image number 55 etc., a total of 10 images. Similarly, D2 is attached to image number 51 etc., a total of 12 images. D3 is attached to image number 53 etc., a total of 2 images. The first determination section 4a determines from these detection results that data of the most images is D2 representing the second child, and first information is appended to this.

Next, using information of images that have been organized by the image organization section 3, the second determination section 4b excludes images to which the first information has been appended and determines the information most often appended to the excluded images. With the example shown in FIG. 6, D2 which is the first information is appended to a total of 12 images, and appended information for images number 61-64 and 66 to which this first information is not appended is D1 for 5 images, and D3 for 0 images. Accordingly, D1 is determined to be the appended information most often appended to images to which information other than the first information is appended, and auxiliary information is appended.

The third determination section 4c determines a priority image based on determination results from the first determination section 4a and determination results from the second determination section 4b. Specifically, it is determined by the first determination section 4a that images having appended information D2 are the most numerous, and it is determined by the second determination section 4b that auxiliary information has been appended to append information D1. Then, in the example shown in FIG. 6, based on the two determination results the third determination section 4c sets image numbers 67, 65, 60, 55 and 57 for which an AND relationship between the two results is established as priority images. It is also possible to set an image having the most appended information, among these five priority images, as a final priority image.

Next, operation of the second embodiment will be described using the flowchart shown in FIG. 7. This processing flow is also executed by a CPU within the control section 1 in accordance with programs stored in the flash memory 12. Processing flow for camera control in the second embodiment is similar to that in FIG. 4, and so detailed description will be omitted and processing flow for priority image determination which is different from the first embodiment will be described using FIG. 7.

Figure 7:
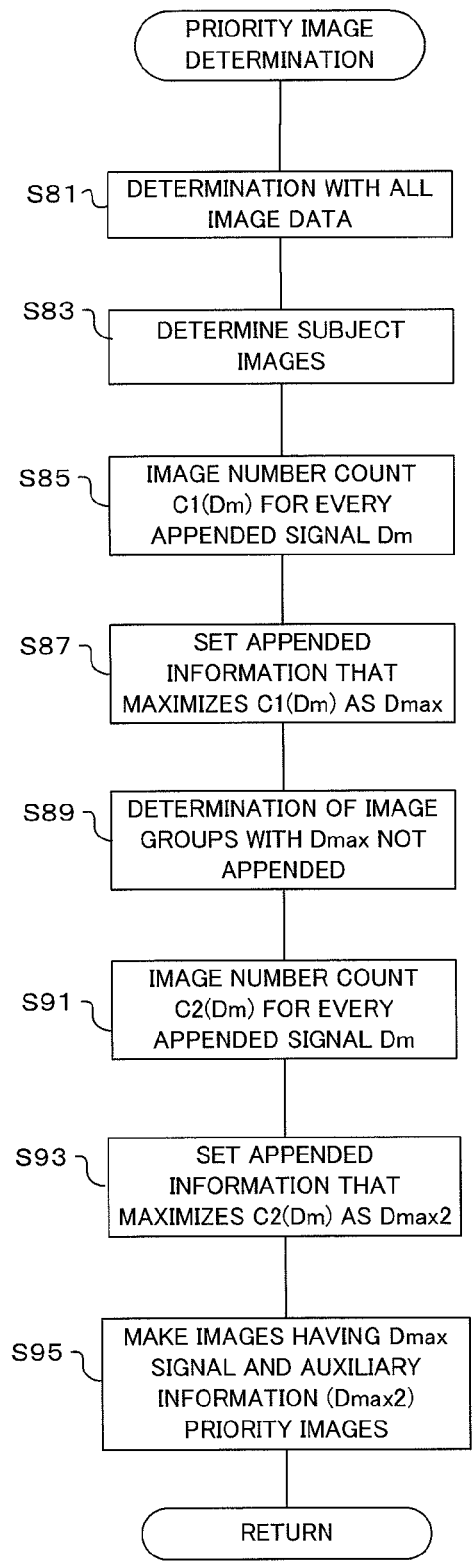
FIG. 7 is a flowchart showing operation for priority image determination for the camera of the second embodiment of the present invention.

If the processing flow for priority image determination shown in FIG. 7 is entered, first of all determination is performed with all appended data (S81), and a subject image is determined (S83). Here, overall appended information is made the subject of determination, and all images in a specified range are made determination subjects. In the example shown in FIG. 6, D1-D3 are all the appended data, and image numbers 51 to 67 constitute the subjects of determination.

Next, a number of images is counted for each of appended information D1 to D3, to give C1(Dm) (S85). For example, in the example shown in FIG. 6, we get a number of images of 10 for appended information D1, a number of images of 12 for appended information D2, and a number of images of 2 for appended information D3.

If count of the number of images has been carried out for each appended information, C1(Dm) is made the maximum appended information Dmax (S87). For example, with the example shown in FIG. 6, since the count of number of images for appended information D2 of 12 is the maximum, this is made the appended information Dmax, and first information is appended. The determination in steps S85 and S87 is carried out by the first determination section 4a.

Next, a group of images to which Dmax is not appended is determined (S89). Images are determined for other than appended information to which Dmax was appended in steps S85 and S87. With the example shown in FIG. 6, a home with two children is assumed, and in this case, since both of the two children are important, after one child has been searched for the other person is searched for.

Next, a number of images is counted for each appended information, to give C2(Dm) (S91). With the example shown in FIG. 6, image Nos 51-60, 65 and 67 are images to which D2, which is Dmax, is appended, these images are excluded, and within the remaining images (Nos 61-64 and 66) images to which information is respectively appended are counted to give C2(Dm). In the example shown in FIG. 6, D1 is appended to five images and D3 is appended to 0 images.

Once the image number count C2(Dm) is obtained, next a maximum appended information for C2(Dm) is set to Dmax2 (S93). With the example shown in FIG. 6 appended information D1 constitutes Dmax2, and auxiliary information is appended to this. The determination in steps S89-S93 is carried out by the second determination section 4b.

Once Dmax2 has been obtained, images having the first information (Dmax information) and the auxiliary information (Dmax2) are made priority images (S95). With the example of FIG. 6 image Nos 55, 57, 60, 65 and 67 have Dmax information and the auxiliary information (Dmax2) and so are made priority images. In this case, since there are a plurality of priority images, is also possible to set an image having the most appended information, among these priority images, as a final priority image.

As has been described above, with the second embodiment of the present invention, in determining priority images based on auxiliary information in addition to the first information, appended information for images to which the most information other than the first information has been appended is made the auxiliary information. As a result, appended information that is appended to the most images becomes the first appended information, and appended information that is appended to the most images among images that have not been appended with the first appended information becomes the auxiliary information. Therefore, with the second embodiment also, priority images have a connection with a plurality of images, and so it is possible to retrieve images for which content of an image group can be ascertained at a glance as priority images.

Also, with the second embodiment, by carrying out similar image retrieval on the basis of priority images, it is possible to retrieve a lot of similar images, and it is possible to display images that have relevance and give interest. In step S89, an image group to which Dmax has not been appended is made a determination subject, but this is not limiting and it is also possible to make all images determination subjects. In cases such as where two siblings are always photographed together, making all images subjects makes it possible to search for one sibling accurately.

Next, a third embodiment of the present invention will be described using FIG. 8 to FIG. 12. In the first and second embodiments of the present invention, one image having appended information for the most images (first appended information) and having auxiliary information was selected, and displayed as a priority image. However since there also cases where a plurality of priority images exist, in a third embodiment it is possible to display a plurality of priority images. In the case of plural display also, in selecting priority images selection is performed by carrying out weighting. As will be described later, differing from domestic photographs, in the case of a user who also shoots photographs of pets or photographs of their work, it is more preferable to select a plurality of priority images.

The structure of the third embodiment is similar to the block diagram shown in FIG. 1 and so detailed description will be omitted. However, similarly to the second embodiment the second determination section 4b obtains appended information for the most images that have been appended with information other than the first information by determination. Also, there are a plurality of determination sections designated up to the nth determination section, that carry out determination in order to select a plurality of priority images.

Selection of the priority images in the third embodiment will be described using FIG. 8. FIG. 8, similarly to FIG. 3, is an example showing image numbers on a horizontal axis, obtaining information being appended for every image on the horizontal axis, and what image information is appended to each image. With the example shown in FIG. 8, images are numbered 71 to 90, and the meanings of appended information D1-D4 of the same as for the case of FIG. 3.

In FIG. 8, image numbers 73, 77, 80, 88, 89 and 90 are displayed collectively. Image 73 is an image of the mother and the second child, and so D3 representing the mother and D2 representing the second child are stored together with the image data as appended information. Image 77 is an image depicting the first child and the second child and so D1 and D2 representing these are stored together with the image data as appended information. Image 80 is an image depicting the first child, the second child and the mother, and so D1, D2 and D3 representing these are stored together with the image data as appended information. Image 88 is an image depicting the mother and a cat, and so D3 and D4 representing these are stored together with the image data. Images 89 and 90 are images depicting cats and so D4 representing this is stored together with the image data.

With the example shown in FIG. 8, D1 is appended to image number 75 etc., a total of 10 images. Similarly, D2 is appended to image number 71 etc., a total of 10 images. D3 is appended to image number 73 etc. a total of 3 images. D4 is appended to image number 88 etc., a total of 3 images.

The first determination section 4a takes these detection results and determines data for the most images to be D1 representing the first child and D2 representing the second child. In this case, the most common data is not a single item of appended information and so weighting is carried out for respective information. With this embodiment, this weighting is carried out in accordance with degree of smiling detected by the face detection section 2a. With the example shown in FIG. 8, the mother who is being taken as the subject of image number 73 is smiling, and so weighting is applied, with a high degree of smiling, and the first appended information becomes D2.

Next, using information of images that have been organized by the image organization section 3, the second determination section 4b determines appended information that is most is common for images to which information other than the first information is appended. With the example shown in FIG. 8, D2 is appended to a total of 10 images, and appended information for images number 81-90 to which D2 is not appended is D1 for 7 images, and D3 for 1 image and D4 for 3 images. Accordingly, D1 is determined to be the appended information most often appended to images to which information other than the first information is appended, and auxiliary information is appended.

The third determination section 4c determines a priority image based on determination results from the first determination section 4a and determination results from the second determination section 4b. Specifically, it is determined by the first determination section 4a that images having appended information D2 are the most numerous, and it is determined by the second determination section 4b that auxiliary information has been appended to appended information D1. Then, in the example shown in FIG. 8, based on the two determination results the third determination section 4c sets image numbers 75, 77 and 80 for which an AND relationship between the two results is established as priority images, and further sets an image (image number 80) having the most appended information among these three priority images as a final priority image.

With this embodiment, the plurality of priority images are selected and displayed. Therefore, even with an initial priority image selected a priority image to be selected next is determined. With the example shown in FIG. 8 priority images are selected based on the most common appended information with the exception of the first appended information D2 and the auxiliary information D1 (with this example, D4).

Figure 10:
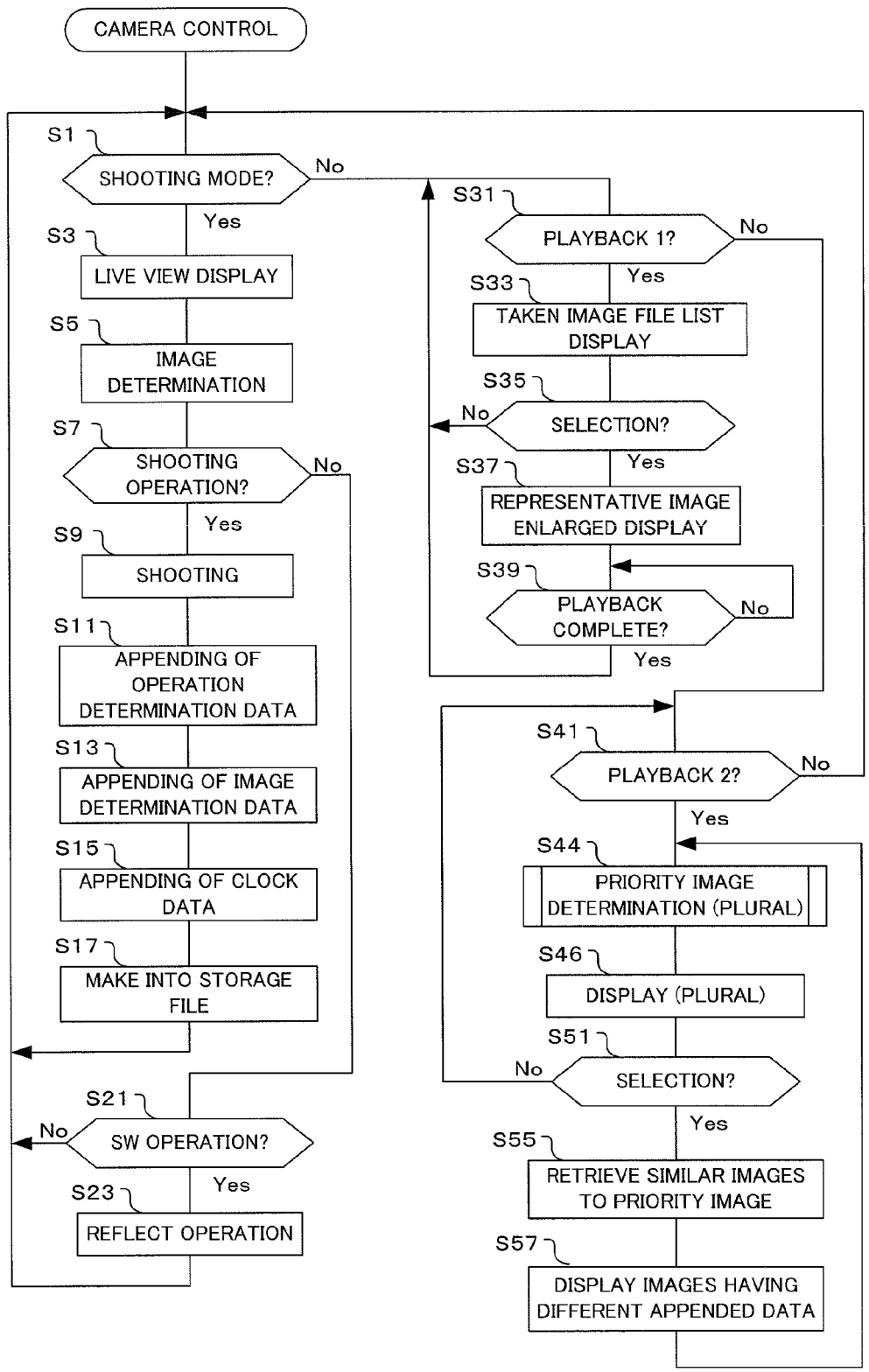
FIG. 10 is a flowchart showing control operations of the camera of the third embodiment of the present invention.
Figure 11:
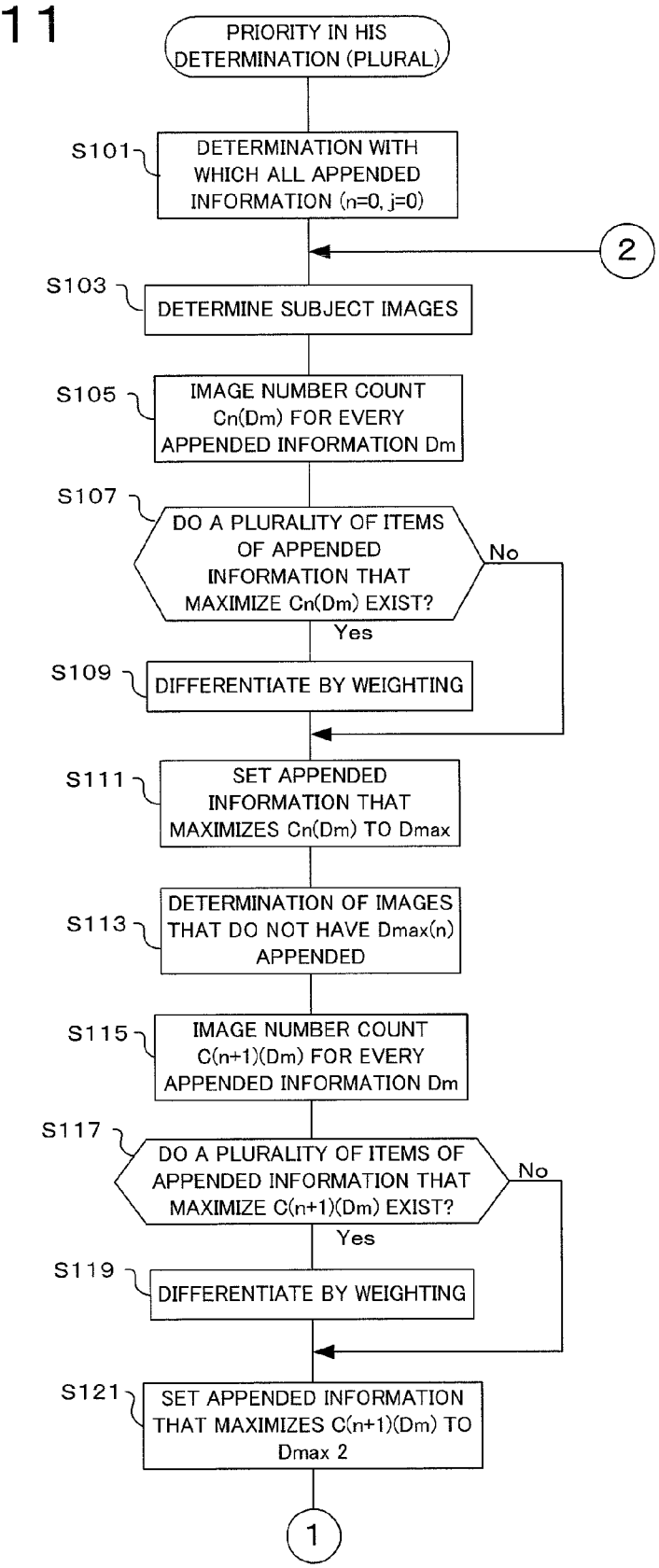
FIG. 11 is a flowchart showing operation for priority image determination for the camera of the third embodiment of the present invention.
Figure 12:
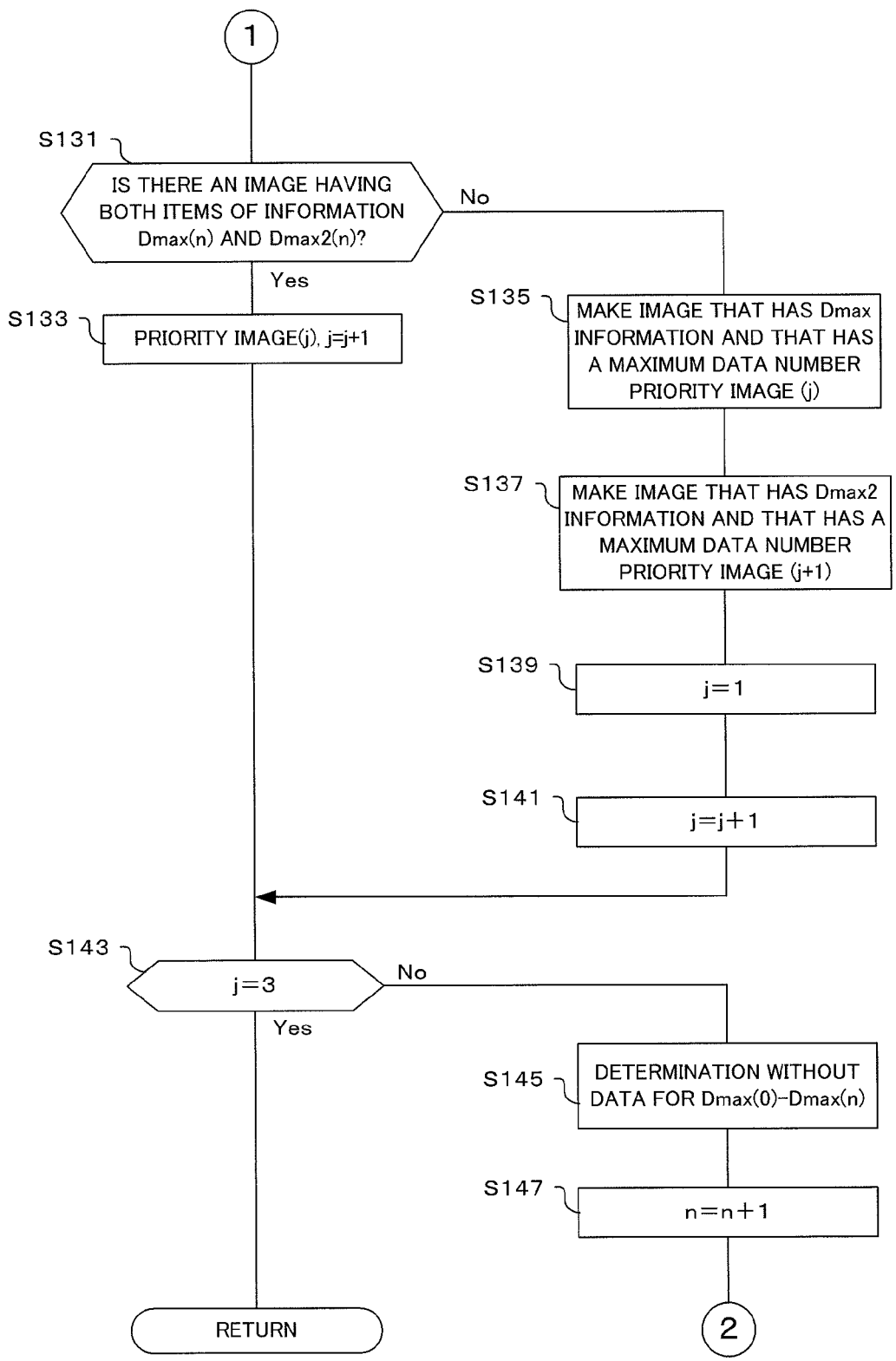
FIG. 12 is a flowchart showing operation for priority image determination for the camera of the third embodiment of the present invention.

Next, operation of this embodiment will be described using the flowcharts shown in FIG. 10 to FIG. 12. This processing flow is also executed by a CPU within the control section 1 in accordance with programs stored in memory such as the flash memory, not shown.

Processing flow for camera control of this embodiment is substantially the same as that in FIG. 4. However, step S44 and after are different and so description will be given focusing on points of difference. If the camera control processing flow shown in FIG. 10 is entered, and if the result of determination in step S41 is playback mode 2, priority image determination (plural) is then carried out (S44). Here, a plurality of priority images are selected using a method such as was used in FIG. 8. Detailed operation of this image selection will described later using FIG. 11 and FIG. 12.

Figure 9A:
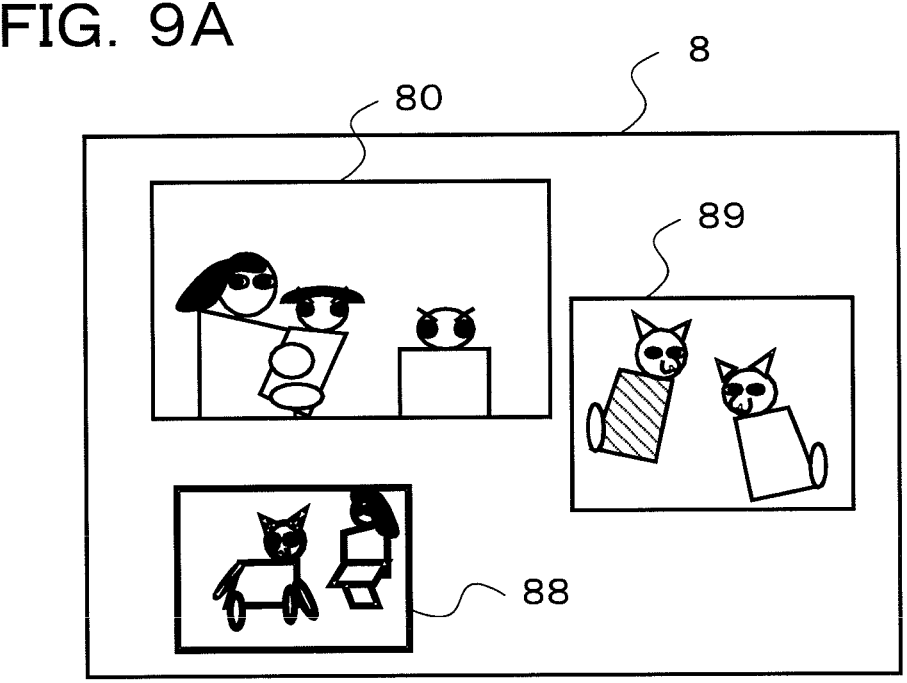
FIG. 9A and FIG. 9B are drawings showing an example of display of a priority image in a camera of a third embodiment of the present invention.

Once priority image selection (plural) has been carried out, display of a plurality of priority images is next carried out (S46). Here, the priority images that were selected in step S44 are displayed on the display section 8, as shown in FIG. 9A. In the example shown in FIG. 8, image No. 80 is selected as a priority image, and image Nos 88 and 89 are selected as the next priority images from among images to which the first appended information and the auxiliary information were not appended, and displayed.

Once a plurality of priority images have been displayed, it is next determined whether or not an image has been selected (S51). Here, it is determined whether the screen of the display section 8 has been touched, and if it has been touched it is determined whether any priority image among the plurality of priority images has been touched. If the result of this determination is that an image has not been selected, processing returns to step S41.

On the other hand, if the result of determination in step S51 is there any priority image has been selected, retrieval of similar images to the selected priority image is carried out (S55). For example, if image No. 80 is selected in FIG. 9A, images that are similar to this image No. 80 are retrieved. Retrieval of similar images is the same as for step 47, and images appended with the same appended information as the appended information that has been appended to the selected priority image are retrieved.

Figure 9B:
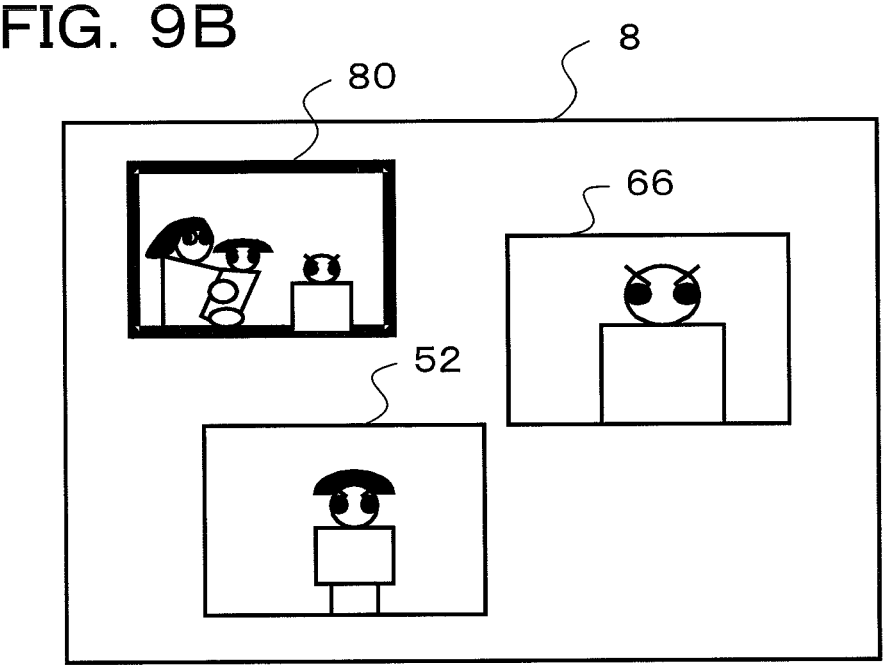

Once retrieval of similar images has been carried out, those having different appended data are displayed (S57). Here, images having different appended data, among similar images retrieved in step S55, are displayed. With the example of FIG. 9A, if image No. 80 is selected, images to which any of mother, first child, or second child are appended are retrieved and displayed. With this example, image Nos 52, 66 having different appended data are displayed, as shown in FIG. 9B, in order to prevent monotony. Once the display of similar images has been carried out, processing returns to step S44.

In this way, with the camera control processing flow of the third embodiment, if playback mode 2 has been selected, a plurality of priority images that enable content of a group of images to be ascertained are selected and displayed. If any priority images are then selected, images that are similar to this selected priority image are retrieved and displayed. Since a plurality of priority images are displayed, the user can retrieve similar images one after the other, and efficient combining of a plurality images or imparting of dramatic effect becomes possible while enjoying retrieval of images.

Next, detailed operation for the priority image determination (plural) of step S44 will be described using FIG. 11 and FIG. 12. If the processing flow for priority image determination (plural) is entered, first all appended information is specified (S101), and a subject image is determined (S103). Here, overall appended information is made the subject of determination, and all images in a specified range are made determination subjects. In the example shown in FIG. 8, D1-D4 are all the appended information, and image numbers 71 to 90 constitute the subjects of determination.

Next, an image number count Cn(Dm) is obtained for each appended information Dm (S105). For example, in the example shown in FIG. 8, for the case of n=0, we get C0(D1)=10 for appended information D1, C0(D2)=10 for appended information D2, C0(D3)=3 for appended information D3, and C0(D4)=3 for appended information D4.

Next, it is determined whether or not plural items of appended information that give maximum Cn(Dm) exist (S107). For example, in the case of n=0 with the example shown in FIG. 8, there are 10 of both C0(D1) and C0(D2), and a plurality of items of appended information that give the maximum exist.

If the result of determination in step S107 is that the plurality of items of appended information exist, they are differentiated by weighting (S109). With this embodiment, weighting is carried out with degree of smiling, and with the example shown in FIG. 8 weighting is performed for appended information D2. Besides carrying out weighting using degree of smiling, it is also possible to carry out weighting in accordance with position or size of a face, for example.

Once the weighting has been carried out in step S109, or if the result of determination in step S107 is that a plurality of appended information that gives the maximum does not exist, appended information that gives the maximum Cn(Dm) is next made Dmax(n) (S111). Here, if the result of determination in step S107 is that a plurality of appended information that result in maximization do not exist, appended information that results in maximization is made Dmax(n). Also, if a plurality of items of appended information that maximize Cn(Dm) do exist, appended information maximizing Cn(Dm) is selected using weighted appended information, and this is made Dmax(n). With the example shown in FIG. 8, appended information D2 is selected as Dmax(0).

Once Dmax(n) has been obtained, images that do not have Dmax(n) appended are determined (S113). Here, images that are not appended with Dmax(n) are made determination subjects. With the example shown in FIG. 8, images to which appended information D2 is not appended, namely image Nos 81-90, are made determination subjects.

Next, an image number count C(n+1)(Dm) is obtained for each appended information Dm (S115). A number of images is obtained for every appended information Dm in a range of the determination subjects obtained in step S113. With the example shown in FIG. 8 C1(D1)=7, C1(D3)=1 and C1(D4)=3 are obtained.

If image numbers have been counted for each appended information Dm, it is next determined whether or not plural items of appended information that maximize C(n+1) (Dm) exist (S117). Here, it is determined whether a plurality of maximum values for the image number counts obtained in step S116 exist. With the example shown in FIG. 8, since C1(D1) is the sole maximum number, the result of determination is No.

If the result of determination in step S117 is that a plurality of items of appended information exist, they are differentiated by weighting, similarly to step S109 (S119). Once the weighting has been carried out, or if the result of determination in step S117 is that a plurality of appended information that maximize C(n+1) (Dm) do not exist, appended information that gives the maximum C(n+1) (Dm) is next made Dmax2(*n*) (S121).

In step S121, similarly to step S111, if the result of determination in step S117 was that a plurality of appended information items did not exist, appended information for a maximum number of images obtained in step S115 is selected and made Dmax2(*n*), while if there were a plurality of appended information items appended information of the maximum number of images for the number of images that have been subjected to weighting in step S119 is selected. With the example shown in FIG. 8, D1 becomes Dmax2(0).

Once Dmax2(*n*) has been obtained, it is next determined whether or not there is an image having both of the appended information Dmax(n) and Dmax2(*n*) (S131). Dmax(n) is equivalent to first information, and Dmax2(*n*) is equivalent to auxiliary information, but there are cases where there is an image with both information and cases where there is not. With this embodiment, in the case where there is an images having both information, those images are made priority images, while in the case where there are no images having both information, images having Dmax(n) and images having Dmax2(*n*) are respectively made priority images.

If the result of determination in step S131 is that there is an image having both appended information Dmax(n) and Dmax2(*n*), that image is made priority image (j), and j=j+1 (S133). With the example shown in FIG. 8, Dmax(0) is D2, and Dmax2(0) is D1, and images having both appended information are the three images having image No. 75, 77 and 80. There are three images having both appended information, but among these three images, image No 80 having the maximum appended information is made a priority image. j is a number of priority images that will be selected. In recent years there has been a tendency for the screens of display sections of cameras to be made large which means it is possible to have a plurality of priority images.

On the other hand, if the result of determination in step S131 is that there is not an image having both appended information Dmax(n) and Dmax2(*n*), Dmax(n) and Dmax2(*n*) are respectively made priority images in step S135 and after. First, an image having Dmax information, and also having a maximum number of information items, is made priority image (j) (S135).

An image having Dmax2 information and having the maximum number of information items is then made priority image (j+1) (S137). j=1 is then set (S139), and j=j+1 is set (S141). In steps S135-S141, two priority images are selected.

If priority image (j) is selected in step S133, or if j=j+1 is set in step S141, it is determined whether or not j=3 (S143). As was described above, j is a variable representing a number of selected priority images, and in the case where j=3 does not hold, three images have not yet been selected as priority images.

If the result of determination in step S143 is that j=3 does not hold, determination is next carried out without data Dmax (0)-Dmax(n) (S145). Here, images that have so far not been appended with Dmax are selected. Here, obtaining of images having no Dmax(0)-Dmax(n) data is in order to select images depicting subjects that have not appeared in priority images that have been selected so far, so as to give variety to images selected as priority images.

If an image constituting a determination subject is defined in step S145, next n=n+1 is set (S147), processing returns to step S103, and then selection of priority images is carried out. Variable n is sequentially added until three images have been selected as priority images. On the other hand, if the result of determination in step S143 is that j=3, the originating processing flow is returned to, and display of plural priority images is carried out in step S46.

In this way, with the third embodiment a plurality of priority images are selected and displayed on the display section 8. Also, in selecting a plurality of priority images, the next priority image is selected from among images that do not include appended information that was used to select the initial priority image. Images from which is it possible to ascertain content of a group of images are therefore prioritized. Since the plurality of priority images are diversified and offer variation, it is also possible to make image retrieval more enjoyable.

Also, with the third embodiment, if a priority image is selected from the plurality of priority images, similar images are retrieved and displayed on the basis of that selected priority image. It also becomes possible to uncover images the user would have had no idea about by repeating sequential search. In step S113, an image group to which Dmax has not been appended is made a determination subject, but this is not limiting and it is also possible to make all images determination subjects. In a case where two siblings are always photographed together, this is better for being able to search for one sibling accurately.

As has been described above, with each of the embodiments of the present invention, information that is appended to most images among information respectively appended to a plurality of images is detected as first information, information other than the first information, among the information respectively appended to a plurality of images, is detected as auxiliary information, an image to which the first information has been appended and which has the auxiliary information is detected as a priority image, and the detected priority image is displayed. It is therefore possible to ascertain at a glance what images are included using the priority image. Also, since this priority image contains a variety of information, it is possible to display images that have relevance and bestow interest by sequentially retrieving similar images from this priority image. It is also possible to determine effective arrangement and combinations of a plurality of photographs, and it is possible to easily create dramatic impact at the time of album creation or slide show creation, and it is possible to increase search performance.

With each of the embodiments of the present invention, description has been given with an example of information D1-D3 based on people's faces and information D4 based on a cat, but it is also possible to have five or more items of information. The present invention is also not limited to people's faces or animals, and other information is also possible. For example, it is possible to have operation determination data or shooting time and date information, etc. With shooting time and date information it is possible to perform search for every day of shooting, and to make the day when most pictures were taken the first information.

Also, each of the embodiments of the present invention has been described with an example applied to a camera, but it is also possible to store taken images in a device such as a personal computer, and to perform image display using processing flow such as that shown with playback mode 2 for these stored taken images. In this case, it is only necessary to execute steps S41-S53 of FIG. 4, and steps S41-S57 of FIG. 10.

Further, with each of the embodiments of the present invention, description has been given using a using a digital camera as an apparatus for taking pictures, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image display device for selecting and displaying priority images from a plurality of images, comprising:
    a first determination section for monitoring information that identifies a subject respectively appended to the plurality of images, and detecting subject identification information that has been appended to the most images among the plurality of images as first information;
    a second determination section for counting a number of items of subject identification information other than the first information, among the subject identification information at the time of shooting that has been respectively appended to the plurality of images, and detecting whether or not a number of the items of subject identification information other than the first information, is more than that of the other images, as auxiliary information; and
    a third determination section for detecting an image to which the first information has been appended, and which is an image having the auxiliary information, as a priority image.

2. The image display device of claim 1, wherein the auxiliary information is a number, among numbers of information that has been appended to respective images of the plurality of images, that is the most common number.

3. The image display device of claim 1, wherein the auxiliary information is information, among images to which the first information has been appended, that is appended to the most images.

4. The image display device of claim 1, wherein the first determination section, in the event that there are a plurality of items of information appended to the most images, among the plurality of images, performs weighting on the images, and carries out determination on the basis of information after weighting.

5. The image display device of claim 1, wherein the third determination section detects priority images until a predetermined plural number of the priority images have been reached.

6. The image display device of claim 1, wherein the third determination section, in the event that an image to which the first information is appended, and that has the auxiliary information, does not exist, makes images to which the first information has been appended and images having the auxiliary information, respective priority images.

7. An image display device, comprising:
a storage section for storing a plurality of images to which subject identification information has been respectively assigned;
a first determination section for detecting information that has been appended to the most images, among the subject identification information assigned to the plurality of images stored in the storage section, as first information;
a second determination section for counting a number of items of information other than the first information, among the subject identification information that has been respectively appended to the plurality of images stored in the storage section, and detecting whether or not a number of the items of subject identification information other than the first information, is more than that of the other images, as auxiliary information;
a third determination section for detecting images having the first information and the auxiliary information as priority images; and
a display section for displaying the priority images.

8. The image display device of claim 7, wherein the second determination section detects images to which the most information has been appended, among images stored in the storage section, as auxiliary information.

9. The image display device of claim 7, wherein the second determination section detects auxiliary information from remaining images after excluding images having the first information, among images stored in the storage section.

10. The image display device of claim 7, wherein the first determination section, in the event that there are a plurality of items of information appended to the most images, among the plurality of images, performs weighting on the images, and carries out determination on the basis of information after weighting.

11. An image display method for selecting and displaying priority images from a plurality of images, comprising:
monitoring subject identification information respectively appended to the plurality of images, and detecting information that has been appended to the most images among the plurality of images as first information;
counting a number of items of information other than the first information, among the subject identification information that has been respectively appended to the plurality of images, and detecting whether or not a number of the items of subject identification information other than the first information, is more than that of the other images, as auxiliary information;
detecting an images to which the first information has been appended, and that is an image having the auxiliary information, as a priority image; and
displaying the determined priority images.

12. The image display device of claim 1, wherein:
information respectively appended to the plurality of images is acquired at the time of taking individual images.

13. The image display device of claim 7, wherein:
information respectively appended to the plurality of images stored in the storage section is acquired at the time of taking individual images.

14. The image display method of claim 11, wherein:
information respectively appended to the plurality of images is acquired at the time of taking individual images.

* * * * *